United States Patent
Matsumoto (10) Patent No.: US 9,874,682 B2
(45) Date of Patent: Jan. 23, 2018

(54) DISPLAY APPARATUS

(71) Applicant: Sakai Display Products Corporation, Sakai-shi, Osaka (JP)

(72) Inventor: Kouji Matsumoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/305,574

(22) PCT Filed: Jul. 2, 2014

(86) PCT No.: PCT/JP2014/067671
§ 371 (c)(1),
(2) Date: Oct. 20, 2016

(87) PCT Pub. No.: WO2016/002027
PCT Pub. Date: Jan. 7, 2016

(65) Prior Publication Data
US 2017/0045679 A1    Feb. 16, 2017

(51) Int. Cl.
*F21V 7/04* (2006.01)
*F21V 8/00* (2006.01)
*G02F 1/1335* (2006.01)

(52) U.S. Cl.
CPC ......... *G02B 6/0088* (2013.01); *G02F 1/1335* (2013.01)

(58) Field of Classification Search
USPC ................................................. 362/606, 600
See application file for complete search history.

(56) References Cited

U.S. PATENT DOCUMENTS

2007/0019127 A1    1/2007  Oohira
2013/0258251 A1*  10/2013  Lee ..................... H05K 1/0209
                                                                 349/69

FOREIGN PATENT DOCUMENTS

JP    2007-25484 A    2/2007
JP    2007-86648 A    4/2007

* cited by examiner

Primary Examiner — Vip Patel
(74) Attorney, Agent, or Firm — Bret E. Field; Bozicevic, Field & Francis LLP

(57) ABSTRACT

A display apparatus according to an aspect of the present disclosure comprises a display panel, a light source device illuminating the display panel from a back side of the display panel, an optical sheet arranged between the display panel and the light source device, and a support for supporting the optical sheet. In the display apparatus, a part of a peripheral portion of the optical sheet is sandwiched and held between the display panel and the support. In the display apparatus, a remaining part of the peripheral portion of the optical sheet is not sandwiched and held between the display panel and the support.

4 Claims, 8 Drawing Sheets

FIG. 6

DISPLAY APPARATUS

CROSS-REFERENCE TO RELATED APPLICATIONS

This application is the national phase under 35 U. S. C. § 371 of PCT International Application No. PCT/JP2014/067671 which has an International filing date of Jul. 2, 2014 and designated the United States of America.

FIELD

The present invention relates to a display apparatus in which an optical sheet is disposed between a display panel and a light source device.

BACKGROUND

A liquid crystal display apparatus includes a liquid crystal display panel on which an image is displayed, and a light source device which illuminates the liquid crystal display panel from the back side of the liquid crystal display panel. A group of optical sheets (hereinafter also referred to as "optical sheet group") are disposed between the liquid crystal display panel and the light source device. Light emitted from the front of the light source device is diffused, condensed and so forth by the optical sheet group, and enters the liquid crystal display panel.

In the description below, an example where the liquid crystal display panel is arranged in a vertical posture will be described.

The liquid crystal display panel is sandwiched and held between a frame-like support member (bezel, for example) at the front side and a frame-like support member (P chassis, for example) at the back side.

The light source device includes a light source formed of a fluorescent tube, an LED or the like, a light guide member such as a light guide plate or a diffusion plate which guides the light emitted by the light source to the back side of the display panel, and a backlight chassis (hereinafter referred to as BL chassis) which houses the light source and the light guide member.

A peripheral portion of the optical sheet group is disposed between the liquid crystal display panel and the P chassis, or between the P chassis and the BL chassis. Optical sheets constituting the optical sheet group are generally arranged in parallel with the liquid crystal display panel.

An optical sheet expands due to heat generated by the light source device. Thus, in the case where the peripheral portion of the optical sheet group is completely secured (held between the liquid crystal display panel and the P chassis, for example) along the entire periphery thereof, the optical sheets are prevented from expanding by heat, possibly causing flexure, wrinkles or the like therein.

In the case where the peripheral portion of the optical sheet group is not secured at all (e.g., is loosely inserted into a groove formed between the P chassis and the BL chassis), however, the optical sheets may slide over or collide against the liquid crystal display panel, which may possibly damage the liquid crystal display panel. The sliding or collision of the optical sheets occurs due to unwanted swaying (so-called fluttering) of the optical sheets that is caused by, for example, an external force applied to the liquid crystal display apparatus.

Conventionally, the liquid crystal display apparatus has been proposed that suppresses buckling of the optical sheet due to its own weight (see Japanese Patent Application Laid-Open Publication No. 2007-86648, which is hereinafter referred to as Patent Document 1).

The optical sheet according to Patent Document 1 is so curved that a middle part in the lateral direction is away from the liquid crystal display panel. As the curved optical sheet has a larger buckling load compared to a flat optical sheet, buckling of the optical sheet due to its own weight is suppressed.

The peripheral portion of the optical sheet according to Patent Document 1 is loosely inserted into a groove. Thus, the optical sheet is not easily deformed due to thermal expansion thereof. Moreover, since the optical sheet is so curved as to be away from the liquid crystal display panel, it will not easily slide over and collide against the liquid crystal display panel. Therefore, the liquid crystal display panel will not easily be damaged due to fluttering of the optical sheet.

SUMMARY

In the case of the optical sheet according to Patent Document 1, however, the optical sheet may be curved toward the liquid crystal display panel if, for example, a large external force is applied to the liquid crystal display apparatus and the optical sheet greatly sways in the direction of moving toward or away from the liquid crystal display panel, which may cause the optical sheet to slide over or collide against the liquid crystal display panel, thereby possibly damaging the liquid crystal display panel.

Moreover, the arrangement of a curved optical sheet is more difficult compared to the arrangement of a flat optical sheet. Furthermore, if the optical sheet is curved, it is necessary to devise a way for the light transmitted through the optical sheet to uniformly enter the liquid crystal display panel. That is, the arrangement of a flat optical sheet is more advantageous in terms of enhanced assembly and display quality of the liquid crystal display apparatus.

The present disclosure has been made in view of the circumstances described above, and has a main object of providing a display apparatus which can suppress both unwanted fluttering and unwanted deformation due to thermal expansion, for the optical sheet in a flat arrangement.

A display apparatus according to an aspect of the present disclosure comprises a display panel, a light source device illuminating the display panel from a back side of the display panel, an optical sheet arranged between the display panel and the light source device, and a support for supporting the optical sheet. In the display apparatus, a part of a peripheral portion of the optical sheet is sandwiched and held between the display panel and the support. In the display apparatus, a remaining part of the peripheral portion of the optical sheet is not sandwiched and held between the display panel and the support.

In the display apparatus according to another aspect of the present disclosure, the optical sheet has a rectangular shape. In the display apparatus, portions facing each other in one set of opposed two sides of the optical sheet are sandwiched and held.

In the display apparatus according to another aspect of the present disclosure, the optical sheet is arranged in a vertical posture. In the display apparatus, the one set of opposed two sides are two vertical sides. In the display apparatus, at least a lower side of the optical sheet is not sandwiched and held between the display panel and the support.

In the display apparatus according to another aspect of the present disclosure, the light source device includes a light source and a light guide member that guides light emitted by the light source to the back side of the display panel. In the display apparatus, at least a part of the peripheral portion away from the light source is sandwiched and held. In the display apparatus, a part of the peripheral portion close to the light source is not sandwiched and held.

According to an aspect of the present disclosure, the peripheral portion of the optical sheet is partially secured by being sandwiched and held between the display panel and the support. This suppresses unwanted fluttering of the optical sheet.

The remaining part of the peripheral portion of the optical sheet is not secured by being held between the display panel and the support. Therefore, thermal expansion of the optical sheet is not hindered. That is, unwanted deformation of the optical sheet due to thermal expansion is suppressed.

As the area where the optical sheet is sandwiched and held to be secured with respect to the peripheral direction of the optical sheet is increased, unwanted fluttering of the optical sheet is more easily suppressed. On the other hand, as the area where the optical sheet is not sandwiched and held to be secured is increased, unwanted deformation of the optical sheet is more easily suppressed. Therefore, the area where the optical sheet is sandwiched and held may be designed in consideration of the balance between the suppression of fluttering and the suppression of deformation.

Moreover, it is not necessary to arrange the optical sheet in a curved manner if an appropriate peripheral portion of the optical sheet is sandwiched and held.

According to another aspect of the present disclosure, portions facing each other in one set of opposed two sides of a rectangular optical sheet are sandwiched and held by the display panel and the support to be secured.

In the case where a tension is applied with respect to the optical sheet in the opposite direction of the held portion, the optical sheet may be kept in a flat manner.

In the case where the one set of opposed two sides are entirely held, at least a part of the other set of opposed two sides in the rectangular optical sheet is not held.

According to another aspect of the present disclosure, the opposed parts of two vertical sides in the rectangular optical sheet arranged in a vertical posture are sandwiched and held by the display panel and the support so as to be secured.

The remaining opposed two sides of the optical sheet are not secured, at least at the lower side thereof, by being held between the display panel and the support. Therefore, thermal expansion of the optical sheet as well as extension of the optical sheet due to its own weight are not hindered. That is, unwanted deformation of the optical sheet due to thermal expansion and its own weight is suppressed.

According to another aspect of the present disclosure, a peripheral portion of the optical sheet, which is away from the light source, is secured by being sandwiched and held between the display panel and the support. The remaining peripheral portion of the optical sheet is not secured by being sandwiched and held between the display panel and the support.

Compared to the portion away from the light source, heat generated by the light source is more easily transmitted to the portion close to the light source. Therefore, the portion of the optical sheet which is close to the light source is more easily expanded by heat compared to the portion away from the light source. In other words, as the portion of the optical sheet which is easily expanded by heat is not secured, unwanted deformation of the optical sheet due to thermal expansion is further suppressed.

In the case of the display apparatus according to an aspect of the present disclosure, since a part of the peripheral portion of the optical sheet is secured while the remaining part thereof is not secured, unwanted fluttering and deformation of the optical sheet may both be suppressed.

Moreover, it is not necessary to employ a curved arrangement of the optical sheet, and thus the optical sheet may flatly be arranged. This facilitates the assembly of the liquid crystal display apparatus and enhances the display quality thereof.

The above and further objects and features will more fully be apparent from the following detailed description with accompanying drawings.

DETAILED DESCRIPTION

The present disclosure will be described below in detail with reference to the drawings illustrating the embodiments thereof. In the following description, upper, lower, front, back, left and right are used as indicated by the arrows in the drawings.

Embodiment 1

Figure 1:
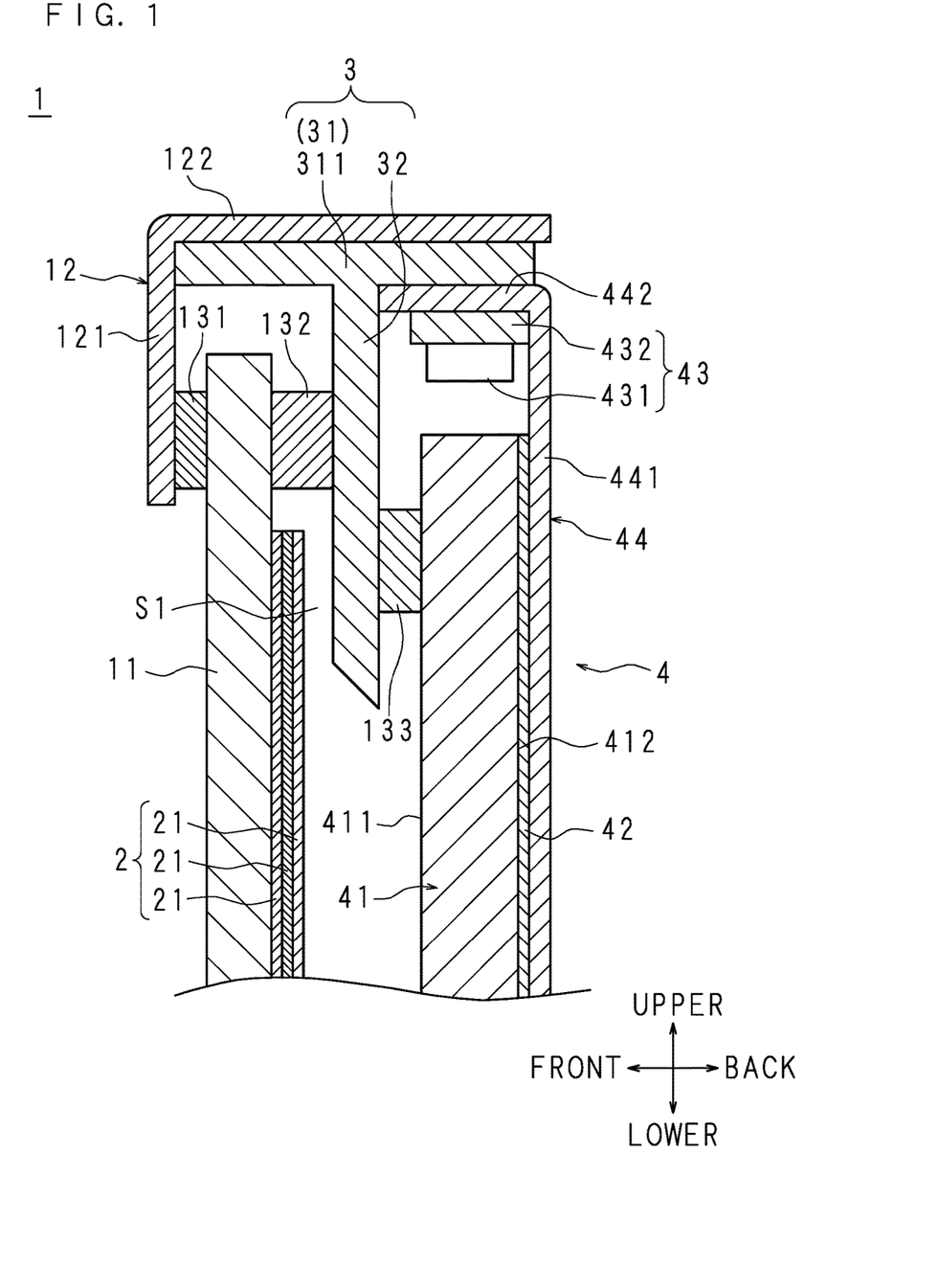
FIG. 1 is a section view schematically illustrating a structure near the upper side of an optical sheet group in a display apparatus according to Embodiment 1 of the present disclosure.

FIG. 1 is a section view schematically illustrating a structure near the upper side of an optical sheet group 2 in a display apparatus 1 according to Embodiment 1 of the present disclosure.

Figure 2:
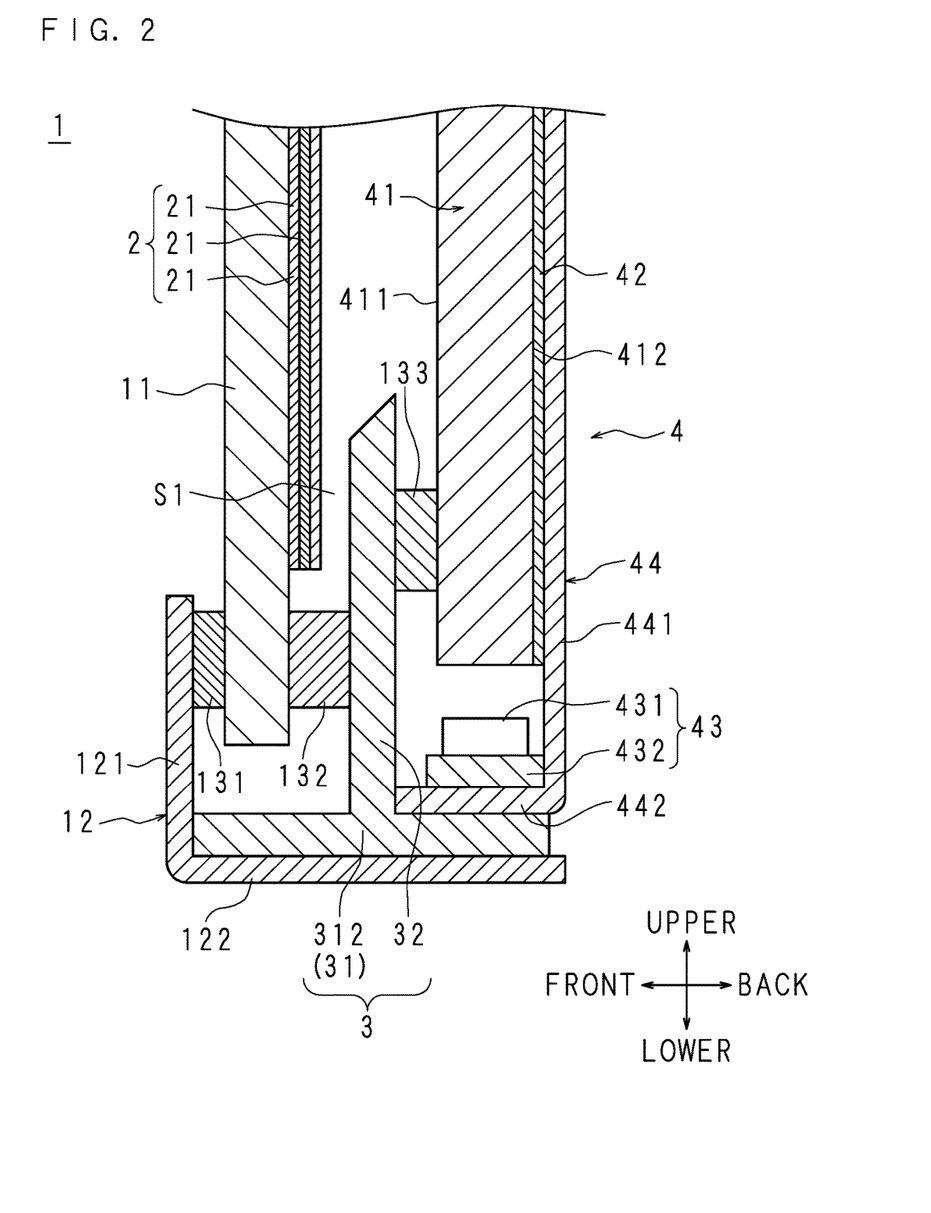
FIG. 2 is a section view schematically illustrating a structure near the lower side of the optical sheet group in the display apparatus.
Figure 3:
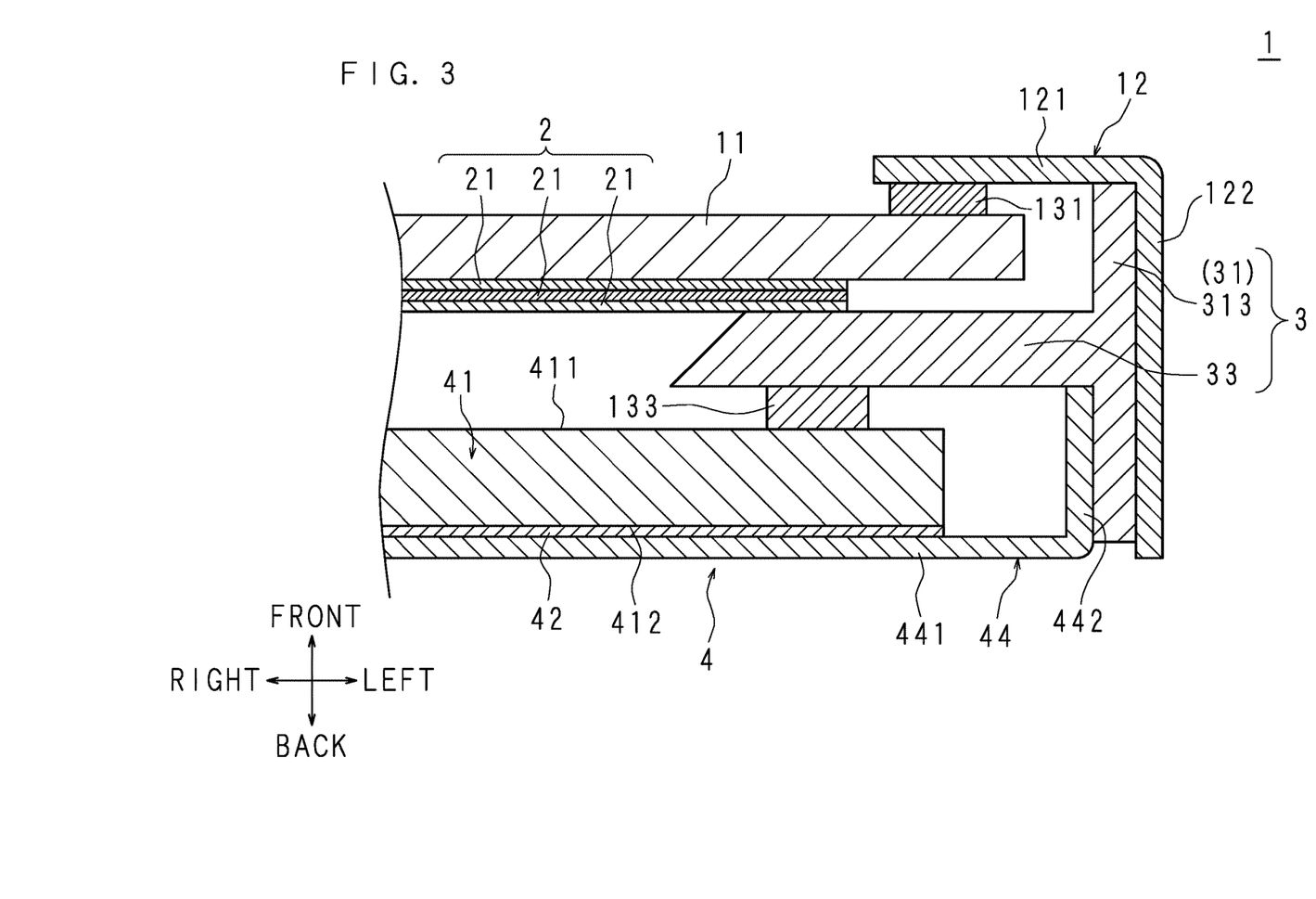
FIG. 3 is a section view schematically illustrating a structure near the left side of the optical sheet group in the display apparatus.

FIGS. 2 and 3 are section views schematically illustrating structures near the lower side and the left side of the optical sheet group 2 in the display apparatus 1.

Figure 4:
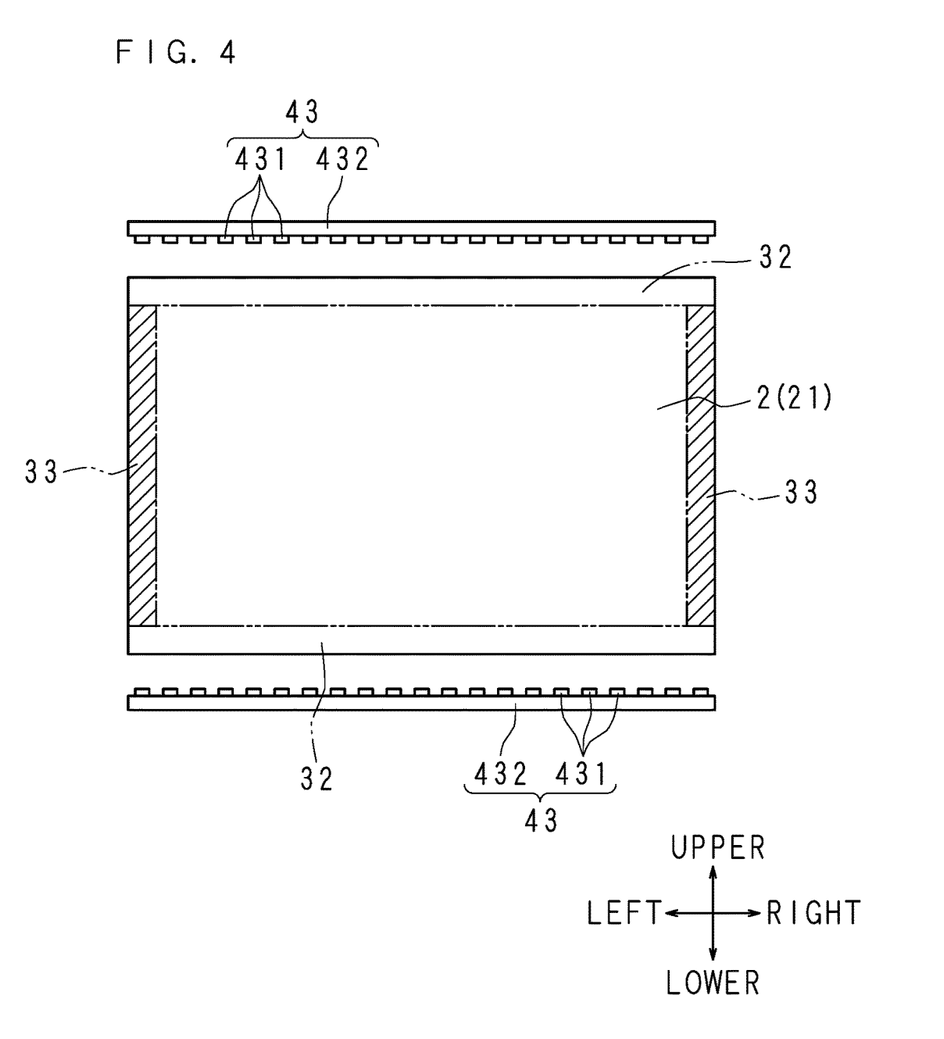
FIG. 4 is a front view schematically illustrating held/not-held areas of the optical sheet group included in the display apparatus.

FIG. 4 is a front view schematically illustrating held/not-held areas of the optical sheet group 2 included in the display apparatus 1. The hatched portions in FIG. 4 indicate the areas in which the optical sheet group 2 is held.

The display apparatus 1 according to the present embodiment is configured as, for example, a television receiver, a digital signage or a monitor for a personal computer.

First, the structure of the display apparatus 1 is described.

The display apparatus 1 comprises a display panel 11, a bezel 12, an optical sheet group 2, a P chassis (support) 3 and a light source device 4, and further comprises a heat sink, a cabinet and the like that are not illustrated here.

The heat sink is to release heat generated in the display apparatus 1 to the outside.

The cabinet houses the display panel 11, bezel 12, optical sheet group 2, P chassis 3, light source device 4, heat sink and the like while a display region of the display panel 11 is exposed.

The display panel 11 is formed of a liquid crystal display panel. The display panel 11 is in a rectangular shape and is arranged in a vertical posture. The display panel 11 includes a rectangular display region and a frame region having the shape of a rectangular frame which surrounds the display region. The display panel 11 is constituted by a glass substrate on the front side and a glass substrate on the back side. Liquid crystal is enclosed between the two glass substrates. The transmission rate of the display panel 11 varies in accordance with voltage applied to the liquid crystal in the display panel 11.

The bezel 12 is a frame-like support member for supporting the display panel 11 on the front side. The bezel 12 includes a front face part 121 having the shape of a rectangular frame in the vertical posture and a side face part 122 having the shape of a rectangular tube in the front-back direction which protrudes backward from the outer periphery of the front face part 121.

The front face part 121 covers the frame region of the display panel 11 from the front side. A buffer member 131 in the shape of a rectangular frame is arranged between the front face part 121 and the frame region of the display panel 11. The display region of the display panel 11 is exposed through the opening of the front face part 121.

The optical sheet group 2 has the shape of a rectangular layer stack constituted by the layers of multiple optical sheets 21, 21 . . . , each having a rectangular shape. The optical sheet group 2 is arranged in a vertical posture which is parallel to the rear face of the display panel 11, and covers the display region of the display panel 11 from the back side. The optical sheets 21 constituting the optical sheet group 2 have, for example, the function of diffusing or condensing light.

The P chassis 3 is a frame-like support member for supporting the display panel 11 and the optical sheet group 2 at the back side, and is non-translucent (has light-shielding or light-reflecting property, for example). The P chassis 3 is located closer to the back side than the front face part 121 of the bezel 12 and closer to the inner side than the side face part 122.

The P chassis 3 includes a base 31 having the shape of a rectangular tube in the front-back direction, and horizontal support pieces 32, 32 as well as vertical support pieces 33, 33, each of which is in the vertical posture.

The base 31 is covered by the side face part 122 of the bezel 12. At the middle part in the front-back direction of the base 31, horizontal support pieces 32, 32 and vertical support pieces 33, 33 protrude inward. More specifically, horizontal support pieces 32, 32 protrude downward (and upward) at the upper face part 311 (and lower face part 312) of the base 31, whereas vertical support pieces 33, 33 protrude in the lateral direction at the side face parts 313, 313 (only the side face part 313 on the left is illustrated in FIG. 3). A part of the base 31 which is closer to the front than the positions from which the horizontal support pieces 32, 32 and vertical support pieces 33, 33 protrude covers a peripheral portion of the display panel 11.

The horizontal support pieces 32, 32 are to support the upper side and the lower side that are the lateral sides of the display panel 11. Buffer members 132, 132 each having the shape of a horizontal rod are arranged between the horizontal support pieces 32, 32 and the frame region at the upper and lower sides of the display panel 11. The upper and lower sides of the display panel 11 are sandwiched and held between the front face part 121 of the bezel 12 and the horizontal support pieces 32, 32 of the P chassis 3 via the buffer members 131, 132 and 132.

Between the leading end portions of the horizontal support pieces 32, 32 and the rear face (back face) of the display panel 11, air gaps S1, S1 are formed for a length corresponding to the thickness (length in the front-back direction) of each buffer member 132. The thickness of the buffer member 132 is larger than the thickness of the optical sheet group 2 even if compressed by being sandwiched and held.

The upper and lower sides of the optical sheet group 2 are loosely inserted into the air gaps S1, S1. The upper and lower ends of the optical sheet group 2 are so arranged as to be separated from the buffer members 132, 132 by an appropriate distance.

The vertical support pieces 33, 33 support the left side and the right side that are vertical sides of the display panel 11, while supporting the left side and the right side of the optical sheet group 2. The left and right sides of the display panel 11 are sandwiched and held between the front face part 121 of the bezel 12 and the vertical support pieces 33, 33 of the P chassis 3 via the buffer members 131 and the left and right sides of the optical sheet group 2.

In other words, the left and right sides of the optical sheet group 2 are sandwiched and held between the left and right sides of the display panel 11 and the vertical support pieces 33, 33 of the P chassis 3.

That is, parts of the peripheral portion (left and right sides) of the optical sheet group 2 are held between the display panel 11 and the P chassis 3. On the other hand, the remaining part of the peripheral portion (upper and lower sides) of the optical sheet group 2 is not fixed by being held between the display panel 11 and the P chassis 3.

As such, according to the present embodiment, the portions facing each other in one set of opposed two sides of the optical sheet group 2 are sandwiched and held, whereas the other set of opposed two sides (at least the lower side) are not sandwiched and held. The held one set of opposed two sides are two vertical sides.

The light source device 4 according to the present embodiment includes a light guide plate 41, a reflection sheet 42, light sources 43, 43 and a BL chassis 44.

The light guide plate 41 has the shape of a rectangular plate. The light guide plate 41 is made of, for example, acrylic resin.

The light entered into the light guide plate 41 is emitted through a front face 411 of the light guide plate 41 (i.e. the light guide plate 41 emits planar light). Thus, at the rear face 412 of the light guide plate 41, multiple reflection parts (not illustrated) are located. The light entered into the reflection part is reflected to the front face 411 side.

A peripheral portions of the light guide plate 41 are opposed to the horizontal support pieces 32, 32 and vertical support pieces 33, 33 of the P chassis 3. Between the peripheral portions of the light guide plate 41 and the horizontal support pieces 32, 32 as well as vertical support pieces 33, 33, a rectangular frame-shaped buffer member 133 with light shielding property is arranged.

The reflection sheet 42 is formed in a rectangular shape. The reflection sheet 42 covers the rear face 412 of the light guide plate 41.

The light sources 43, 43 are located respectively above and below the light guide plate 41. At the front of the light sources 43, 43, the horizontal support pieces 32, 32 of the P chassis 3 are arranged.

Each of the light sources 43 includes multiple LEDs 431, 431 . . . and an LED substrate 432.

The LED substrate 432 is formed in a rectangular shape with a laterally-long arrangement extending in the left-right direction.

The LEDs 431, 431 . . . included in the upper (or lower) light source 43 are mounted at equal intervals in a line on the lower face (or upper face) of the LED substrate 432. The LEDs 431, 431 . . . included in the upper (or lower) light source 43 are opposed to the upper end face (or lower end face) of the light guide plate 41 with an appropriate distance in between.

The light emitted from the light sources 43, 43 will not enter the display panel 11 and the optical sheet group 2 unless it passes through the light guide plate 41.

The BL chassis 44 includes a rear face part 441 and the side face part 442.

The BL chassis 44 supports each of the light sources 43 via the heat sink (not illustrated). Between the rear face part 441 of the BL chassis 44 and the horizontal support pieces 32, 32 as well as vertical support pieces 33, 33 of the P chassis 3, the light guide plate 41 and the reflection sheet 42 are sandwiched and held via the buffer members 133. The side face part 442 of the BL chassis 44 supports the base 31 of the P chassis 3 from the inner side, at a position closer to the back side than the positions where the horizontal support pieces 32, 32 and vertical support pieces 33, 33 protrude from the base 31.

In place of the light sources 43, 43, the light source device 4 may also comprise a light source (formed of a fluorescent tube, for example) supported by the BL chassis 44 so as to be located at the back side of the reflection sheet 42. Here, the light source device 4 may include a diffusion plate in place of the light guide plate 41.

The light emitted by the LEDs 431, 431, . . . of the light sources 43, 43 passes through the upper end face or the lower end face of the light guide plate 41 and enters the interior of the light guide plate 41. The light entered into the light guide plate 41 is reflected at the front face 411, the rear face 412 or the reflection part of the light guide plate 41, and is transmitted through the front face 411 to be emitted to the outside of the light guide plate 41. A part of the light entered into the light guide plate 41 passes through the rear face 412 (i.e. light leakage occurs). The light leaking from the rear face 412 of the light guide plate 41 is reflected at the reflection sheet 42 and re-enters into the light guide plate 41.

The light transmitted through the front face 411 of the light guide plate 41 and emitted to the outside passes through the optical sheet group 2 and then through the rear face of the display panel 11, to enter the interior of the display panel 11. That is, the light emitted by the light source device 4 is diffused, condensed and so forth by the optical sheet group 2, and illuminates the display panel 11 from the back side.

The light entered into the display panel 11 is transmitted through the display panel 11 or is blocked for its passage in the display panel 11. As a result, an image is displayed in the display region of the display panel 11.

The light guide plate 41 and the reflection sheet 42 according to the present embodiment function as light guide members which guide the light emitted by the light sources 43, 43 to the back side of the display panel 11.

The procedure of assembling the display apparatus 1 will now be described.

A worker arranges the reflection sheet 42, light guide plate 41 and buffer member 133 at the front side of the rear face part 441 of the BL chassis 44 in this order. Moreover, light sources 43, 43 are mounted to the BL chassis 44 together with the heat sink.

Next, the worker mounts the P chassis 3 to the BL chassis 44. Here, the rear end of the base 31 of the P chassis 3 is supported by the side face part 442 of the BL chassis 44.

Subsequently, the worker arranges the optical sheet group 2 at the front side of the horizontal support pieces 32, 32 and vertical support pieces 33, 33 of the P chassis 3, and arranges the buffer members 132, 132 at the front side of the vertical support pieces 33, 33.

Next, the worker places the buffer members 132, 132 between the upper side of the display panel 11 and horizontal support piece 32 and between the lower side and the other horizontal support piece 32, while placing the optical sheet group 2 between the left side of the display panel 11 and the vertical support piece 33 of the P chassis 3 and between the right side of the display panel 11 and the other vertical support piece 33.

As a result, the left side and the right side of the optical sheet group 2 are sandwiched and held between the display panel 11 and the P chassis 3, while the upper side and the lower side are inserted into air gaps S1, S1 that are formed between the display panel 11 and the P chassis 3.

Subsequently, the worker positions the buffer member 131 on the front side of the display panel 11 and then attaches the bezel 12 to the P chassis 3. Here, the worker puts the buffer member 131 between the front face part 121 of the bezel 12 and the display panel 11, and the side face part 122 of the bezel 12 is attached to the base 31 of the P chassis 3.

In the display apparatus 1 as described above, the optical sheet group 2 is not necessarily curved as in the optical sheet according to Patent Document 1, and thus is flatly arranged to be in parallel with the display panel 11. This is because the left side and the right side of the optical sheet group 2 are sandwiched and held, which may maintain the posture of the optical sheet group 2 to be flat by applying appropriate tension between the left side and the right side of the optical sheet group 2. In other words, it is difficult for the optical sheet group to buckle.

The flat arrangement of the optical sheet group 2 is easier than the curved arrangement. Hence, the assembly of the liquid crystal display apparatus 1 may be facilitated.

The arrangement of the optical sheet group 2 in parallel with the display panel 11 means that it is easier for the light transmitted through the optical sheet group 2 to uniformly enter the display panel 11. That is, the display panel 11 is uniformly illuminated, which may enhance the display quality of the display device 1.

As the left side and right side of the optical sheet group 2 are sandwiched and held to be secured, an effect of suppressing unwanted fluttering of the optical sheet group 2 is produced. This suppresses damages to the display panel 11 due to unwanted fluttering of the optical sheet group 2.

On the other hand, the upper side and the lower side of the optical sheet group 2 are not sandwiched and held to be secured. This means that the optical sheet group 2 is not prevented from stretching upward and downward when expanded due to heat. Moreover, the upper side and the lower side of the optical sheet group 2 are located closer to the light sources 43, 43 compared to the left and the right sides, so that the heat generated by the light sources 43, 43 are easily transmitted. Moreover, the upper side and the lower side of the optical sheet group 2 are more easily expanded by heat compared to the left side and the right side.

More specifically, the lower side of the optical sheet group 2 stretches not only by thermal expansion but also by its own weight.

Accordingly, as the upper side and the lower side of the optical sheet group 2 are not held, unwanted deformation of the optical sheet group 2 due to prevention of the stretch of the optical sheet group 2 may preferably be suppressed.

It is noted that the light sources 43, 43 may also be arranged to face the right and left end faces of the light guide plate 41, respectively. It may also be configured here that the upper side and the lower side of the optical sheet group 2 are sandwiched and held to be secured, whereas the left side and the right side of the optical sheet group 2 are not sandwiched and held to be secured.

Furthermore, only one of the light sources 43, 43 may be provided. In the case where only the upper (or lower) light source 43 is provided, the part away from the light source 43, i.e. the lower side (or upper side) of the optical sheet group 2, may be sandwiched and held to be secured.

Embodiment 2

Figure 5:
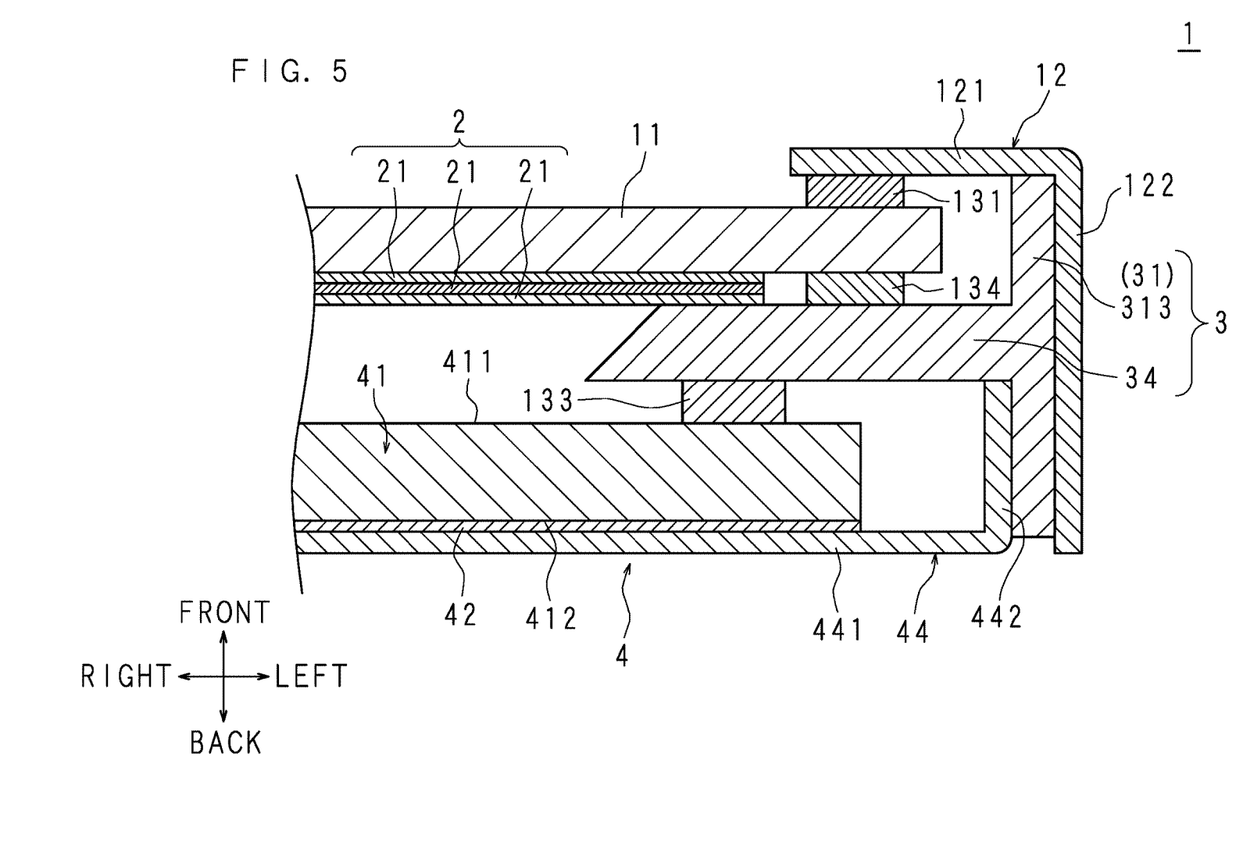
FIG. 5 is a section view schematically illustrating a structure near an upper part of the right side of an optical sheet group in a display apparatus according to Embodiment 2 of the present disclosure.
Figure 6:
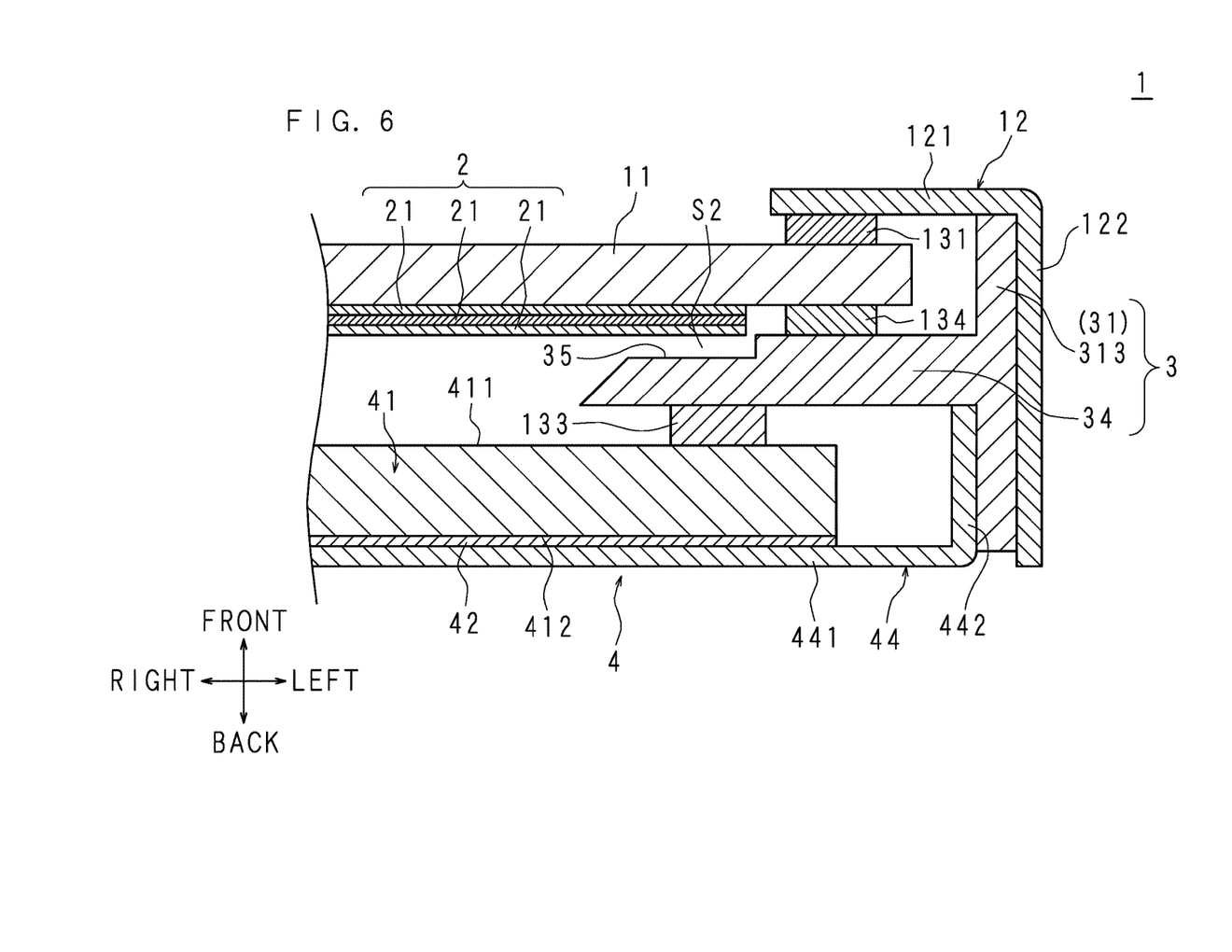
FIG. 6 is a section view schematically illustrating a structure near a lower part of the right side of the display apparatus.

FIGS. 5 and 6 are section views schematically illustrating a structure near an upper right side and a lower right side of an optical sheet group 2 in a display apparatus 2 according to Embodiment 2 of the present disclosure. FIGS. 5 and 6 correspond to FIG. 3 in Embodiment 1.

Figure 7:
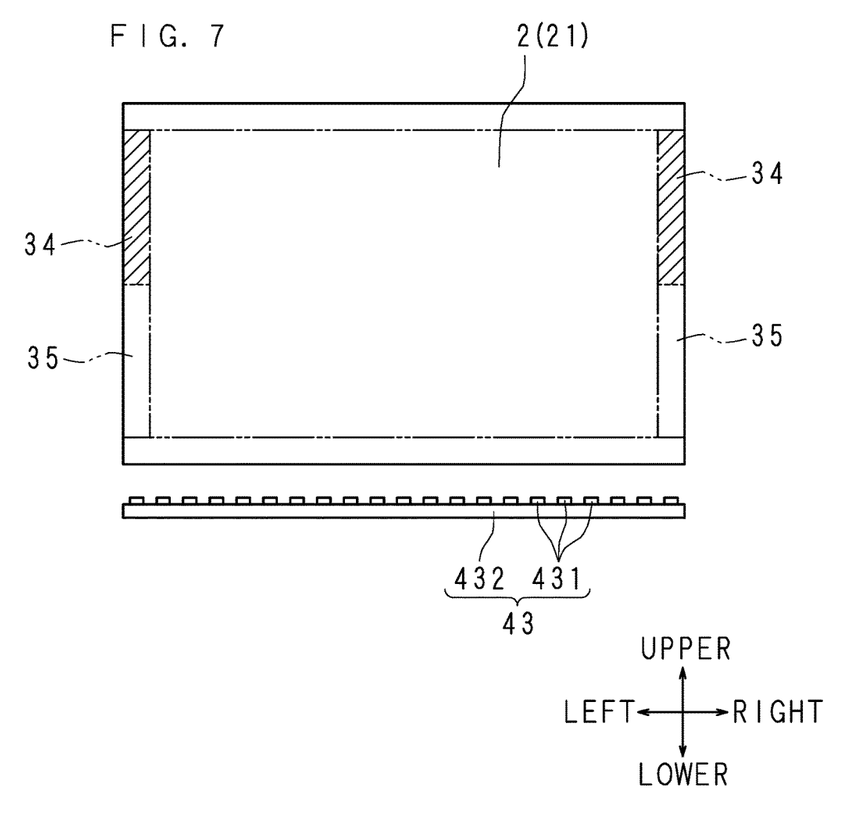
FIG. 7 is a front view schematically illustrating the held/not-held areas of the optical sheet group included in the display apparatus.

FIG. 7 is a front view schematically illustrating the held/not-held areas of the optical sheet group 2 included in the display apparatus 1. FIG. 7 corresponds to FIG. 4 in Embodiment 1, while the hatched portions in FIG. 7 indicate the areas where the optical sheet group 2 is held.

The display apparatus 1 according to the present embodiment has a structure substantially similar to the display apparatus 1 according to Embodiment 1. In the description below, the difference between the present embodiment and Embodiment 1 will be described, while the parts corresponding to Embodiment 1 will be denoted by the same reference numerals and will not be described here.

The display apparatus 1 according to the present embodiment includes a lower light source 43 but not an upper light source 43.

The P chassis 3 included in the display apparatus 1 according to the present embodiment has vertical support pieces 34, 34 in place of the vertical support pieces 33, 33 according to Embodiment 1.

The vertical support pieces 34, 34 are substantially similar to the vertical support pieces 33, 33. On the front side of the leading end at the lower half of each vertical support piece 34, a recess 35 is formed in the shape of an L-shaped cutoff.

Thus, the upper halves of the vertical support pieces 34, 34 are configured similarly to the vertical support pieces 33, 33, while the lower halves of the vertical support pieces 34, 34 are configured to have recesses 35, 35 formed in the vertical support pieces 33, 33.

Air gaps S2, S2 are formed between the inner surfaces of the recesses 35, 35 and the display panel 11. The length in the front back direction of each air gap S2 (length from the rear face of the display panel 11 to the inner rear face of the recess 35) is greater than the thickness of the optical sheet group 2.

The upper halves of the left and right sides of the optical sheet group 2 are held between the left and right sides of the display panel 11 and the vertical support pieces 34, 34 of the P chassis 3.

On the other hand, the lower halves of the left and right sides of the optical sheet group 2 are loosely inserted into the air gaps S2, S2. The left end (and right end) of the optical sheet group 2 is arranged to be separated from the inner left face (and inner right face) of the recess 35 by an appropriate distance.

In Embodiment 1, since the optical sheet group 2 is interposed between the display panel 11 and the vertical support pieces 33, 33, no buffer member is arranged between them.

According to the present embodiment, the buffer members 134, 134 each having the shape of a vertical rod are arranged between the display panel 11 and portions of the vertical pieces 34, 34 except for the leading end portions. The thickness of each of the buffer members 134, 134 that are held and compressed between the display panel 11 and the vertical support pieces 34, 34 is substantially equal to the thickness of the optical sheet group 2.

In the optical sheet group 2 according to the present embodiment, parts of the left and right sides of the optical sheet group 2 that are away from the light source 43 (i.e., upper half) are sandwiched and held to be secured. On the other hand, parts of the left and right sides of the optical sheet group 2 that are close to the light source 43 (i.e., lower half) are not sandwiched and held to be secured.

That is, in the optical sheet group 2, a portion in which heat generated by the light source 43 is easily transmitted and stretching due to thermal expansion and the sheets' own weight easily occur is not secured. This can preferably suppress unwanted deformation of the optical sheet group 2 caused by the optical sheet group 2 being prevented from stretching.

On the other hand, in the optical sheet group 2, at least a part of the portion in which heat generated by the light source 43 is not easily transmitted and stretch due to thermal expansion and the sheets' own weight is not likely to occur is secured, thereby suppressing unwanted fluttering of the optical sheet group 2, while suppressing damages to the display panel 11 caused by such unwanted fluttering of the optical sheet group 2.

Embodiment 3

Figure 8:
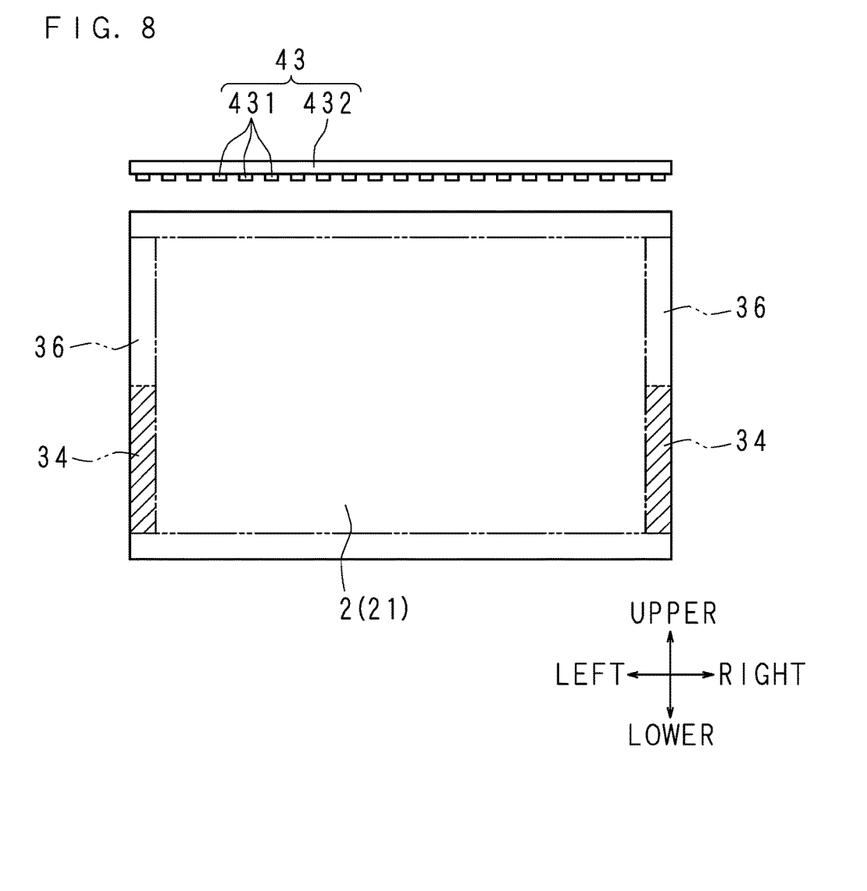
FIG. 8 is a front view schematically illustrating the held/not-held areas of the optical sheet group included in a display apparatus according to Embodiment 3 of the present disclosure.

FIG. 8 is a front view schematically illustrating the held/not-held areas of the optical sheet group 2 included in a display apparatus 1 according to Embodiment 3 of the present disclosure. FIG. 8 corresponds to FIG. 7 in Embodiment 2, while the hatched portions in FIG. 7 indicate the areas where the optical sheet group 2 is sandwiched and held.

The display apparatus 1 according to the present embodiment has a structure substantially similar to the display apparatus 1 according to Embodiments 1 and 2. In the description below, the difference between the present embodiment and Embodiments 1, 2 will be described, while the components corresponding to Embodiment 2 will be denoted by the same reference numerals and will not be described here.

The display apparatus 1 according to the present embodiment includes the upper light source 43 according to Embodiment 1 but does not include the lower light source 43.

The P chassis 3 included in the display apparatus 1 according to the present embodiment has vertical support pieces 34, 34 that are substantially similar to the vertical support pieces 34, 34 according to Embodiment 2. The vertical support pieces 34, 34 according to the present embodiment are, however, provided with recesses 36, 36 in place of the recesses 35, 35 according to Embodiment 2.

On the front side of the leading end at the upper half of the vertical support piece 34, a recess 36 is formed in the shape of an L-shaped cutoff.

That is, the lower halves of the vertical support pieces 34, 34 are configured similarly to the vertical support pieces 33, 33 according to Embodiment 1, while the upper halves of the vertical support pieces 34, 34 are provided with recesses 36, 36 similar to the recesses 35, 35 in the vertical support pieces 33, 33.

Spaces similar to the air gaps S2, S2 in Embodiment 2 are formed between the inner surfaces of the recesses 36, 36 and the display panel 11.

The lower halves of the left and right sides of the optical sheet group 2 are held between the left and right sides of the display panel 11 and the vertical support pieces 34, 34 of the P chassis 3.

On the other hand, the upper halves of the left and right sides of the optical sheet group 2 are loosely inserted into the air gaps between the inner surfaces of the recesses 36, 36 and the display panel 11.

In the optical sheet group 2 according to the present embodiment, portions of the left and right sides of the optical sheet group 2 that are away from the light source 43 (i.e., lower halves) are sandwiched and held to be secured. On the other hand, portions of the left and right sides of the optical sheet group 2 that are close to the light source 43 (i.e., upper halves) are not sandwiched and held to be secured.

In other words, in the optical sheet group 2, the portion where the heat generated by the light source 43 is easily transmitted and stretch is likely to occur due to thermal expansion is not secured, which preferably suppress unwanted deformation of the optical sheet group 2 caused by the optical sheet group 2 being prevented from stretching.

On the other hand, in the optical sheet group 2, the portion where the heat generated by the light source 43 is not easily transmitted and stretch is not likely to occur due to thermal expansion is secured, which suppress unwanted fluttering of the optical sheet group 2 as well as damages to the display panel 11 caused by the unwanted fluttering of the optical sheet group 2.

It should be understood that the embodiments disclosed herein are illustrative and non-restrictive in every respect. Since the scope of the present disclosure is defined by the appended claims rather than by the description preceding them, and all changes that fall within metes and bounds of the claims, or equivalence of such metes and bounds thereof are therefore intended to be embraced by the claims.

Moreover, as long as the effect of the present disclosure can be produced, the display apparatus 1 may include components not disclosed in Embodiments 1-3.

The components (technical features) disclosed in each example embodiment may be combined with one another, and such combinations may form new technical features.

DESCRIPTION OF REFERENCE CODES

It is noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus, comprising:
a display panel;
a light source device illuminating the display panel from a back side of the display panel;
an optical sheet arranged between the display panel and the light source device; and
a support for supporting the optical sheet,
wherein
a part of a peripheral portion of the optical sheet is sandwiched and held between the display panel and the support, and
a remaining part of the peripheral portion of the optical sheet is not sandwiched and held between the display panel and the support.

2. The display apparatus according to claim 1, wherein the optical sheet has a rectangular shape, and
portions facing each other in one set of opposed two sides of the optical sheet are sandwiched and held.

3. The display apparatus according to claim 2, wherein the optical sheet is arranged in a vertical posture,
the one set of opposed two sides are two vertical sides, and
at least a lower side of the optical sheet is not sandwiched and held between the display panel and the support.

4. The display apparatus according to claim 1, wherein the light source device includes a light source and a light guide member that guides light emitted by the light source to the back side of the display panel,
at least a part of the peripheral portion away from the light source is sandwiched and held, and
a part of the peripheral portion close to the light source is not sandwiched and held.

* * * * *